Aug. 18, 1925.
G. F. KOLB
1,550,267
AUTOMOBILE BUMPER
Filed Feb. 10, 1925
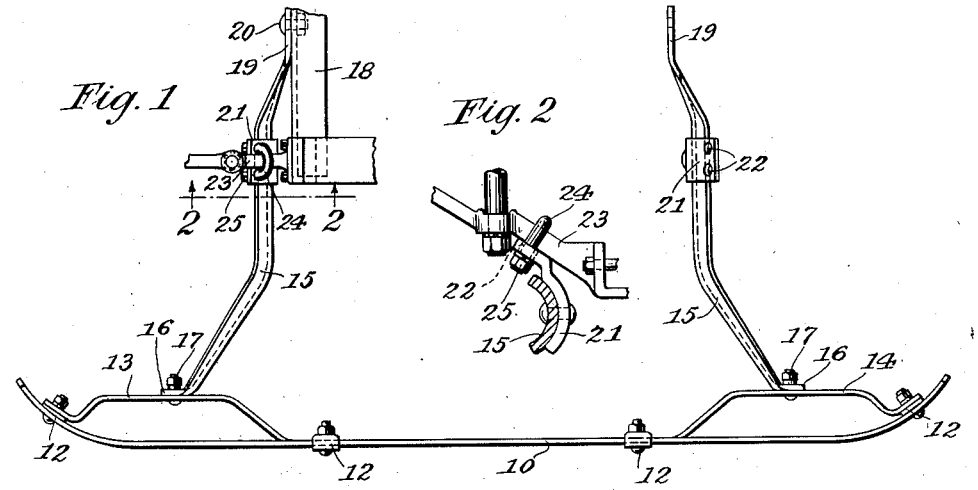
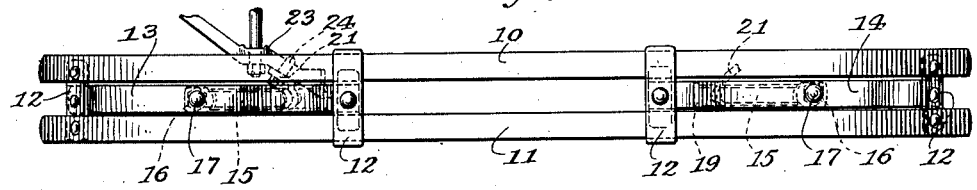
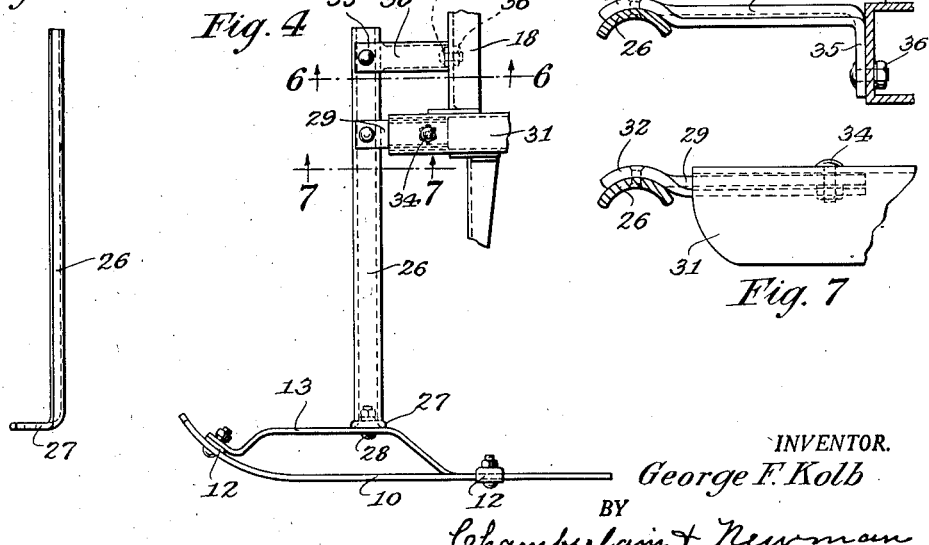
INVENTOR.
George F. Kolb
BY
Chamberlain + Newman
ATTORNEYS.

Patented Aug. 18, 1925.

1,550,267

UNITED STATES PATENT OFFICE.

GEORGE F. KOLB, OF FAIRFIELD, CONNECTICUT, ASSIGNOR TO THE BULLARD MACHINE TOOL CO., OF BRIDGEPORT, CONNECTICUT, A CORPORATION OF CONNECTICUT.

AUTOMOBILE BUMPER.

Application filed February 10, 1925. Serial No. 8,151.

*To all whom it may concern:*

Be it known that I, GEORGE F. KOLB, a citizen of the United States, and resident of Fairfield, in the county of Fairfield and State of Connecticut, have invented certain new and useful Improvements in Automobile Bumpers, of which the following is a specification.

The present invention relates to a bumper for automobiles, particularly of the Ford type, and has for an object to provide a structure of this character of simple construction, which may be conveniently attached to the existing frame of the automobile, without necessitating any change therein, and which when attached will form a substantial structural part of the frame, providing a bumper structure which will be effectual in withstanding and absorbing shocks and protecting the automobile from collisions.

A further object is to provide a bracket structure formed from strip metal, and rendered rigid to withstand shocks by imparting a longitudinal channel form thereto, the cross-section being in the form of a segment of a circle.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a plan view of a bumper, according to the invention, and showing a portion of the front end of the automobile frame to which it is attached;

Fig. 2 is a detail enlarged sectional view of one of the attaching portions, taken along the line 2—2 of Fig. 1;

Fig. 3 is a front elevation of the bumper;

Fig. 4 is a plan view of one side of a bumper, according to the invention, adapted for attachment to the rear end of the automobile frame, and showing a portion of the frame;

Fig. 5 is a side view of the attaching bracket arm detached;

Fig. 6 is a detail enlarged sectional view of one of the attaching portions, taken along the line 6—6 of Fig. 4; and Fig. 7 is a similar view of another attaching portion, taken along the line 7—7 of Fig. 4.

Similar reference characters indicate corresponding parts throughout the several figures of the drawings.

Referring to the drawings, and more particularly to Figs. 1 to 3 thereof, the bumper shown therein is adapted, according to the invention, for use at the front of an automobile of the Ford type, and comprises an impact section extending transversely across the front of the automobile, and consisting of a pair of front impact bars 10 and 11, spaced from each other by vertical clips or bars 12 arranged in spaced pairs at each end, and resilient brace bar portions 13 and 14 bent rearwardly and secured at their ends to the intermediate portions of the clips 12 between the bars 10 and 11.

To each of the brace bar portions an attaching bracket, according to the present invention is secured, this bracket consisting of a bar 15 of strip metal channeled longitudinally to provide a cross-section in the form of a segment of a circle, the two longitudinal edges being outwardly and in a vertical plane, as shown in Fig. 2. At its forward end the bar 15 is provided with a flattened angularly bent foot portion 16, to which the brace bar portion of the bumper is secured by a bolt 17, the bar extending rearwardly in a horizontal plane, and being inclined inwardly to an intermediate point where it is bent into a line parallel to and spaced from the side of the automobile frame 18, being then bent inwardly near its rearward end in inclined relation to the outer side surface of the frame, where it is provided with a flattened end portion 19 engaged with the frame and secured thereto by means of a body bolt 20 engaged through holes drilled in the portion 19 and the frame.

Upon the intermediate parallel portion of the bar 15 a bracket 21 is secured by riveting, the bracket being rounded to conform to the surface of the bar and bent inwardly above the bar at an inclined angle, this inclined portion being provided with a pair of spaced apertures 22. The rounding of the bracket to conform to the bar permits it to be attached with a single rivet, without any possibility of relative turning.

The automobile frame, of the type contemplated in the invention, is provided at each side of the forward end of the frame with a lamp and fender supporting bracket 23 supported upon and extending in upwardly inclined relation outwardly from the frame, and this bracket is utilized for completing the attachment of the bumper bracket. For this purpose a U-bolt 24 is hooked about the bracket 23, and its ends are passed through the apertures 22 of the bracket 21, and are secured by nuts 25, thereby cooperating with the body bolt 20 to securely attach and support the bumper.

In Figs. 4 to 7 there is illustrated a modified embodiment of the invention adapted for attaching to the rear of the automobile frame, the impact bumper, proper, being similar in form and construction to the front bumper. To each of the brace bar portions of the rear bumper an attaching bracket, according to the invention, is secured and comprises a bar 26 of strip metal channeled longitudinally in a similar manner to the bar 15 to provide a cross-section in the form of a segment of a circle, the two longitudinal edges of the bar, however, being disposed downwardly and in a horizontal plane, and the bar is furthermore straight from end to end.

At the rearward end of the bar a right angularly bent flattened foot portion 27 is provided to which the brace bar portion of the bumper is secured by means of a bolt 28.

At the forward end of the bar 26 there are secured by riveting a pair of inwardly extending right angularly disposed spaced bars 29 and 30, adapted for attachment to the frame of the automobile, which is provided at its rearward end with a transverse inverted U-cross-section channel beam 31 secured to the rearward ends of the side frame portions 18, and projecting outwardly at each side with respect thereto.

The bars 29 and 30 are channeled longitudinally in a similar manner to the bar 26, are curved longitudinally at their ends and secured to said bar, as at 32 and 33, to conform to the surface thereof, thereby providing a secured relation with said bar by reason of the single rivets, which prevents any possibility of angular turning movement.

The bar 29 is inserted in the channel beam 31 to engage the under surface of its upper portion, and is secured thereto by means of a body bolt 34, the bar and beam being drilled for this purpose, while the bar 30 is provided at its inner end with a right angularly downwardly bent flattened foot portion 35 engaging the outer side surface of the side frame 18, and secured thereto by means of a body bolt 36, the foot portion and the frame being drilled for this purpose.

In both the front and rear brackets, according to the invention, a simple and reliable supporting and attaching bracket is provided for the bumper, and the disposition of the bracket with respect to the frame is such that shocks are transmitted to the frame and absorbed with the least likelihood of damage thereto or distortion of the bumper structure. The manner of attachment is such that the existing frame structure is advantageously utilized, without necessitating any change therein, or putting any dangerous strain thereon.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. In an automobile bumper for use upon the frame ends of an automobile, a bumper bar, and an attaching bracket therefor formed from a strip of longitudinally channeled metal having a flattened foot portion bent angularly at one end, means for securing said foot portion to the bumper bar, means at the other end of said strip for attaching to the frame, and auxiliary means intermediate the ends for attaching to a portion of the frame.

2. In an automobile bumper for use upon the frame ends of an automobile, a bumper bar, and an attaching bracket therefor formed from a strip of longitudinally channeled metal, means securing an end of said strip to the bumper bar, means at the other end of said strip for attaching to the frame, a projecting strip member having one end transversely curved to conform to the surface of said strip and being secured thereto intermediate its ends, and means for securing said strip member to a portion of the frame.

3. In an automobile bumper for use upon the frame ends of an automobile, a bumper bar, and an attaching bracket therefor formed from a strip of longitudinally channeled metal, means securing one end of said strip to the bumper bar, means at the other end for attaching said strip to the frame, a projecting strip member formed at one end to conform to the surface of said strip and being secured thereto, and means for securing said strip member to a portion of the frame.

4. In an automobile bumper for use upon the frame ends of an automobile, a bumper bar, and an attaching bracket therefor formed from a strip of metal longitudinally channeled to provide a cross-section in the form of a segment of a circle, means securing one end of said strip to the bumper bar, means at the other end for attaching said strip to the frame, a projecting strip member formed at one end to conform to the surface of said strip and being secured thereto, and means for securing said strip member to a portion of the frame.

5. In an automobile bumper for use upon the frame ends of an automobile, a bumper bar, and an attaching bracket therefor formed from a strip of metal longitudinally channeled to provide a cross-section in the form of a segment of a circle, means securing one end of said strip to the bumper frame, means at the other end for attaching said strip to the frame, a projecting strip member formed from a strip of longitudinally channeled metal curved longitudinally at one end to conform to the convex surface of said strip and being secured thereto, and means for securing said strip member to a portion of the frame.

6. In an automobile bumper for use upon the frame ends of an automobile, said frame ends being provided at each side with a projected bracket, a bumper bar, and an attaching bracket therefor formed from a strip of metal, means securing an end of said strip to the bumper bar, means at the other end for attaching said strip to the frame, a strip member secured to said strip intermediate its ends extending angularly therefrom and provided with a pair of apertures, and a bifurcated bolt member engaged about said bracket and secured through said apertures of the strip member to complete the attachment of the bumper bracket.

7. In an automobile bumper for use upon the frame ends of an automobile, said frame being provided at its end with a transverse channeled member projecting at each side of the sides of the frame, a bumper bar, and an attaching bracket therefor formed from a strip of metal, means securing an end of said strip to the bumper bar, a pair of angularly projecting members secured in spaced relation to each other at the other end of said strip, one of said members being provided at its end with a foot portion engaging the side of the frame and secured thereto, and the other being engaged with the end of said transverse channeled member and secured thereto.

Signed at Bridgeport in the county of Fairfield and State of Connecticut this 10th day of November A. D. 1924.

GEORGE F. KOLB.